United States Patent [19] · Baba et al.

[11] 3,714,574

[45] Jan. 30, 1973

[54] MOBILE COMMUNICATION SYSTEM

[75] Inventors: Takesi Baba, Tokyo; Koichi Osada; Takuya Hokawa, both of Yokohama; Fumio Suzuki, Yokosuka-shi, all of Japan

[73] Assignees: Hitachi, Ltd.; Japanese National Railways, Tokyo, Japan

[22] Filed: April 25, 1969

[21] Appl. No.: 819,376

[30] Foreign Application Priority Data

April 30, 1968 Japan ................................43/28582

[52] U.S. Cl. ........................325/51, 325/53, 325/54, 343/177

[51] Int. Cl. ..............................................H04b 7/00

[58] Field of Search................325/51, 53, 54, 56, 57; 343/177

[56] References Cited

UNITED STATES PATENTS

| | | | |
|---|---|---|---|
| 3,539,924 | 11/1970 | Daskalakis | 325/51 |
| 3,517,315 | 6/1970 | Malm | 325/54 |
| 3,555,424 | 1/1971 | Malm | 325/53 |
| 3,458,664 | 7/1969 | Adlhoch | 343/177 |

*Primary Examiner*—Robert L. Griffin
*Assistant Examiner*—Joseph A. Orsino, Jr.
*Attorney*—Craig, Antonelli, Stewart & Hill

[57] ABSTRACT

A mobile communication system in which many base stations are disposed along the path of a moving body and are successively switched over as the moving body moves along its path, and a plurality of zones ahead and after the zone through which the moving body is passing are blocked against the radio frequency used by the moving body so as to ensure a minimum talking time. In the system, when two moving bodies during oral communication at the same radio frequency approach each other, the radio frequency used by one of the moving bodies is altered to another frequency and the number of blocked zones is varied depending on the advancing direction of the moving body so as to improve the utility of the radio frequency.

10 Claims, 11 Drawing Figures

INVENTORS
TAKESI BABA, KOICHI OSADA,
TAKUYA HOKAWA and FUMIO SUZUKI
BY
Craig, Antonelli, Stewart and Hill ATTORNEYS INVENTORS
TAKESI BABA, KOICHI OSADA,
TAKUYA HOKAWA and FUMIO SUZUKI
BY
Craig, Antonelli, Stewart and Hill ATTORNEYS INVENTORS
TAKESI BABA, KOICHI OSADA,
TAKUYA HOKAWA and FUMIO SUZUKI
BY
Craig, Antonelli, Stewart and Hill ATTORNEYS INVENTORS
TAKESI BABA, KOICHI OSADA,
TAKUYA HOKAWA and FUMIO SUZUKI
BY
Craig, Antonelli, Stewart and Hill ATTORNEYS

INVENTORS

TAKESI BABA, KOICHI OSADA,

TAKUYA HOKAWA and FUMIO SUZUKI

BY

Craig, Antonelli, Stewart and Hill ATTORNEYS

INVENTORS
TAKESI BABA, KOICHI OSADA,
TAKUYA HOKAWA and FUMIO SUZUKI
BY
Craig, Antonelli, Stewart and Hill ATTORNEYS INVENTORS
TAKESI BABA, KOICHI OSADA,
TAKUYA HOKAWA and FUMIO SUZUKI
BY
Craig, Antonelli, Stewart and Hill ATTORNEYS INVENTORS
TAKESI BABA, KOICHI OSADA,
TAKUYA HOKAWA and FUMIO SUZUKI
BY
Craig, Antonelli, Stewart and Hill ATTORNEYS

INVENTORS

TAKESI BABA, KOICHI OSADA,

TAKUYA HOKAWA and FUMIO SUZUKI

BY

Craig, Antonelli, Stewart and Hill ATTORNEYS

INVENTORS

TAKESI BABA, KOICHI OSADA,

TAKUYA HOKAWA and FUMIO SUZUKI

BY

Craig, Antonelli, Stewart and Hill ATTORNEYS

MOBILE COMMUNICATION SYSTEM

BACKGROUND OF THE INVENTION

1. Field of the Invention

This invention relates to a mobile communication system.

2. Description of the Prior Art

Radio systems or inductive radio systems are generally employed as a means for telephone communication between a fixed communication network and a body moving over a long distance such as a train or automotive vehicle. In this case, overall economy can be achieved by arranging the system in such a manner that mobile stations and fixed stations have a small power radio output and a relatively large number of base stations are disposed along the railroad or highway. In addition, the base stations are preferably spaced at a distance which is sufficient for causing attenuation so as not to bring forth undesirable interference. This arrangement permits the use of the same frequency at base stations several zones apart and thus attains economy of the required frequency band, hence economy of the apparatus.

However, in such a system, means for avoiding interference must be provided in order to deal with a case in which mobile stations which are at a sufficient distance from each other and employ the same frequency approach each other with the lapse of time. A method generally employed for this purpose includes blocking of a plurality of zones which lie on opposite sides of the zone in which the oral communication is being made. Further, in order that the oral communication can sufficiently be made until the oral communication is cut off due to the approach of the moving bodies toward each other, the distance over which the moving bodies approach each other within a guaranteed duration of oral communication must previously be blocked before the oral communication is started. This method is disclosed, for example, in Japanese Pat. Publication No. 15177/1963 entitled "Mobile Communication Blocking System". However, the known method is defective in that the distance to be blocked becomes longer and the utility of the radio frequency is correspondingly reduced as the speed of the moving bodies becomes higher and the guaranteed duration of oral communication becomes longer.

SUMMARY OF THE INVENTION

It is therefore a primary object of the present invention to utilize the radio frequency more effectively. More precisely, the present invention provides a mobile communication system of the kind adapted to make oral communication by selecting one of a plurality of frequencies, in which, when moving bodies during oral communication at the same radio frequency approach each other, the radio frequency used by one of the moving bodies is altered to another frequency for avoiding interference so as to thereby shorten the distance blocked during oral communication, utilize the radio frequency more effectively and make it possible to continue the oral communication over a long period of time.

The probability of all the radio frequencies being in use when the moving bodies during oral communication at the same radio frequency approach each other and the radio frequency used by one of the moving bodies is altered to another frequency, is equal to the probability that all the radio frequencies are in use when a call is originated or the probability of loss. This probability is generally in the order of one-tenth in the loss system. The probability of oral communication being cut off due to lack of any idle and available radio frequency must be very little compared with the probability of loss at the time of origination of a call. The present invention is featured by the fact that a call is originated according to the loss system and alteration of the radio frequency during oral communication is done according to the waiting system.

DESCRIPTION OF THE PREFERRED EMBODIMENT

Figure 1:
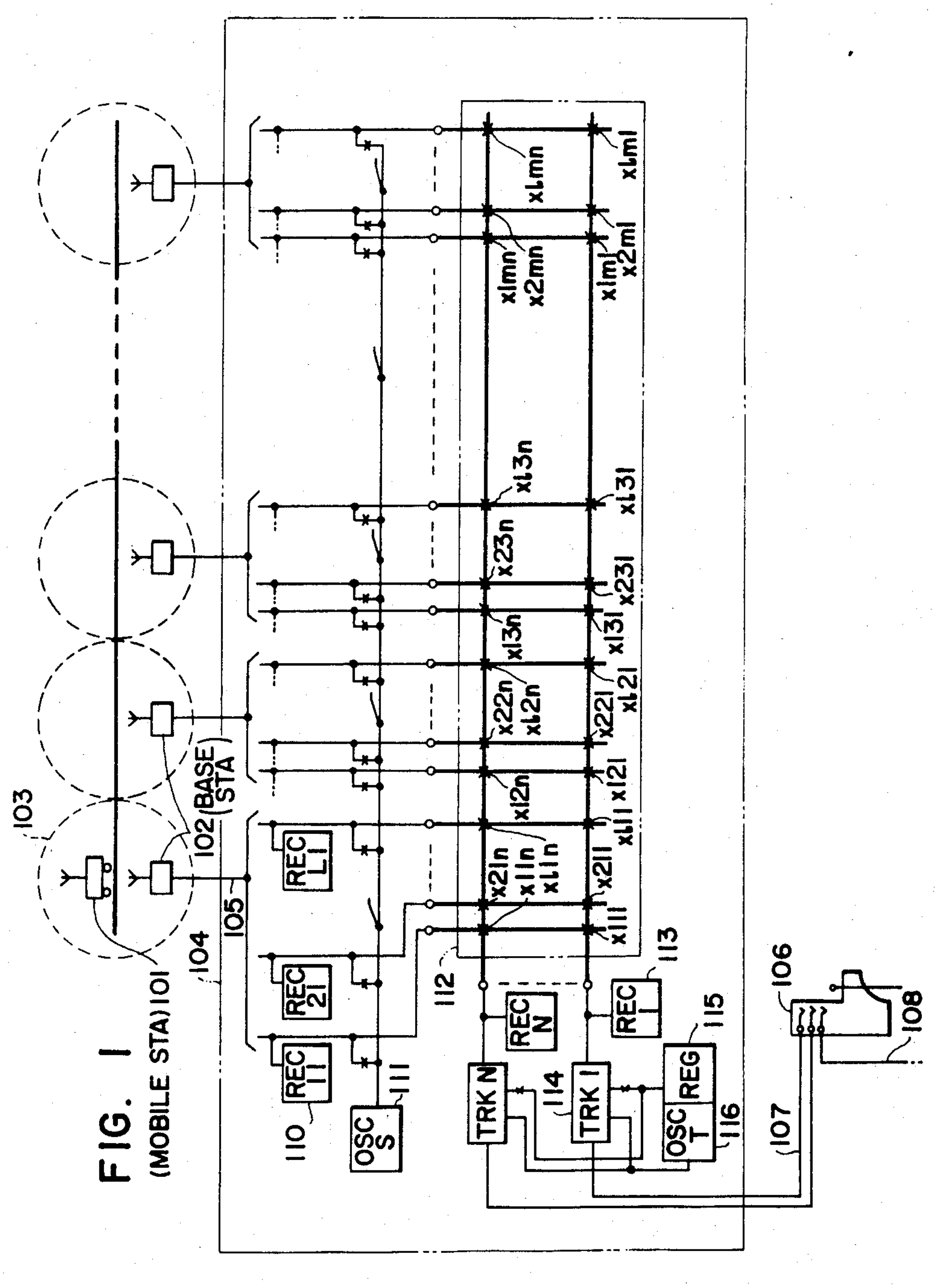
FIG. 1 is a block diagram of the mobile communication system according to the present invention.

Referring to FIG. 1, reference numerals 101, 102, 103 and 104 designate a mobile station, fixed radio stations (hereinafter to be referred to as base stations), zones covered by the respective base stations 102, and a control station, respectively. Trunk lines 105 connect the base stations 102 with the control station 104. An attendant board 106 connects the mobile communication network with a land public communication network. Trunk lines 107 connect the control station 104 with the attendant board 106, and the attendant board 106 is connected with the land public communication network by way of a trunk line 108. The control station 104 includes therein receivers 110 and 113 for receiving a signal sent out from the mobile station, oscillators 111 and 116 for sending out a signal to the mobile station, a connecting link 112, trunks 114, and registers 115.

The connecting operation will be briefly described hereunder. When a subscriber belonging to the land public communication network desires to call the mobile station, the call is received at the attendant board 106 and starts the control station 104 by way of the trunk line 107. A trunk 114 is started in the control station 104 and selects and seizes an idle and available register 115. The register 115 counts and stores the dialed signal sent out from the attendant board 106. After the register 115 receives the dialed signal of a predetermined number of figures, a common control circuit not shown is started. The common control circuit selects an idle and available radio frequency in each zone and closes the connecting link 112. Therefore, when there is an idle and available radio frequency in each of the zones, cross points equal in number of zones where the idle frequency is selected are closed in the connecting link 112. The signal from the oscillator 116 is combined in the register 115 in accordance with the dialed mobile station number and is sent out to the mobile station 101 as an address signal by way of the trunk 114, connecting link 112, trunk lines 105 and base stations 102. This address signal is sent out in all the zones as far as there is an idle and available radio frequency in each of the zones. When the desired mobile station 101 receives the address signal, the mobile station 101 sends out a zone specifying signal representing the zone where the moving body exists and a supervisory signal. The zone specifying signal has a frequency which lies outside the voice frequency band and is continuously sent out until the connection is registered. The zone specifying signal is received by the receiver 110 in the control station 104. The supervisory signal has a frequency which lies within the voice frequency band and is used for the connection control. The supervisory signal is received by the receiver 113 in the control station 104. When the zone specifying signal is received by the receiver 110 in the control station 104, the cross points of the connecting link 112 corresponding to other zones are released. When the supervisory signal sent out from the mobile station 101 is received by the receiver 113 in the control station 104, the trunk 114 releases the register 115 thereby to cease sending of the address signal, and at the same time, the ringing signal which is the output from the oscillator 116 is sent out to the mobile station 101 through a route including the oscillator 116 — trunk 114 — connecting link 112 — trunk line 105 — base section 102 — mobile station 101.

When the mobile station 101 receives the ringing signal, the bell of the telephone set is rung to indicate arrival of the call at the subscriber. When the subscriber raises the handset and answers the call, the mobile station 101 ceases to send out the supervisory signal. Upon identifying the fact that the sending of the supervisory signal is ceased, the trunk 114 in the control station 104 ceases to send out the ringing signal so that a talking path is established between the subscriber belonging to the mobile station 101 and the subscriber belonging to the land public communication network.

When the subscriber belonging to the mobile station 101 originates a call, an idle and available radio frequency is selected in the mobile station 101, and the zone specifying signal and the supervisory signal are sent out. Upon reception of the zone specifying signal by the receiver 110, the control station 104 identifies that the call arrives thereat. An idle and available trunk 114 is selected to close the cross points of the connecting link 112. Upon reception of the supervisory signal by the receiver 113, the trunk 114 sends out to the mobile station 101 a ringing signal which is the output from the oscillator 116. The mobile station 101 ceases to send out the supervisory signal when it receives the ringing signal. Upon identifying the cessation of the supervisory signal, the trunk 114 in the control station 104 acts to cease the sending of the ringing signal and indicates on the switching apparatus 106 by way of the trunk line 107 that a call arrives from the mobile station 101. The operator of the attendant board 106 answers the call, and after oral communication with the subscriber belonging to the mobile station 101, connects the subscriber with the desired subscriber belonging to the land public communication network.

When the mobile station 101 during oral communication moves into an adjacent zone from the previous zone, the mobile station 101 identifies the variation of the zone on the basis of signal supplied from the track or by means of comparison between the strengths of the respective electric fields produced by the two base stations. The mobile station 101 now ceases to send out the previous zone specifying signal and sends out a zone specifying signal corresponding to a new zone into which it has moved. In the control station 104, the new zone specifying signal is received to establish a new talking path in the adjacent zone and the cross points of the connecting link 112 are correspondingly altered.

Since the mobile station 101 has thus moved into the adjacent zone, the mobile station 101 will approach more and more another mobile station which is during oral communication at the same radio frequency. The control station 104 identifies the above fact and selects another idle and available radio frequency. If such an idle and available radio frequency is not present, the control station 104 waits until such radio frequency is obtained. Selection of the idle and available radio frequency is made in the zones of the two mobile stations which are approaching each other. When an idle and available radio frequency is selected in any one of the zones or in one of the two zones where there are idle and available radio frequencies in both zones, a channel specifying signal corresponding to the selected idle and available radio frequency is sent out from the oscillator 111. When the mobile station 101 receives the channel specifying signal, it ceases to send out the zone specifying signal corresponding to the radio frequency at which the oral communication has been made and sends out a zone specifying signal for the radio frequency corresponding to the channel specifying signal. Upon reception of the zone specifying signal at the ratio frequency at which the channel specifying signal is being sent out, the control station 104 ceases to send out the channel specifying signal and alters the cross points. Due to the fact that the channel specifying signal has been ceased, the radio frequency at which the oral communication has been made in the mobile station 101 is now altered to a new radio frequency. The channel specifying signal described above has a frequency which lies in the oral communication frequency band.

It will thus be noted that an idle-line signal at a frequency which lies outside of the voice frequency band is sent out from the control station 104 to indicate the presence of an idle and available radio frequency and ceases to be sent out when an address signal is sent out from the control station 104 or when a call from the mobile station 101 terminates in the control station 104. Further, in order to avoid interference due to use of the same radio frequency in adjacent zones, the idle-line signal indicating the presence of an idle and available radio frequency ceases to be sent out in the zones on opposite sides of the zone being used in order to block such zones. The distance to be blocked is determined in a manner as described with reference to FIG. 2.

Figure 2:
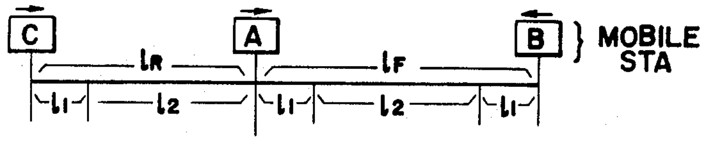
FIG. 2 is a diagrammatic illustration of the method of zone blocking according to the present invention.

Referring to FIG. 2, A, B and C designate mobile stations and the arrows indicate the directions of movement of these mobile stations. Suppose that $l_2$ is the distance required for the mobile station A for preventing undesirable interference and $l_1$ is the distance over which the mobile stations travel while awaiting the appearance of an idle and available radio frequency. Considering the case in which the mobile station B which is moving approaches the mobile station A which is also moving, then it is necessary to block the distance $l_F = l_1$ $+ l_2 + l_1$. Considering further the case in which the mobile station C which is moving approaches the mobile station A which is stationary, then it is necessary to block the distance $l_R = l_1 + l_2$.

Therefore, those zones which lie at least within the distances $l_F$ and $l_R$ must be blocked on opposite sides of the mobile station A, and the idle-line signal indicating the presence of an idle and available radio frequency must cease to be sent out. The waiting time during which the mobile station waits due to the absence of any idle and available radio frequency depends upon the probability of giving rise to interference due to the fact that there is still no idle and available radio frequency even though the mobile station waits that time. The lower this probability, the longer this waiting time will become and hence the blocked distance will become longer.

When the speed of the mobile stations is slow and the waiting time is short, the distance $l_1$ is quite short compared with the distance $l_2$ and there is virtually no difference between the distances $l_F$ and $l_R$. In such a case, the number of blocked zones on one side of the moving mobile station A may be equal to the number of blocked zones on the other side of the mobile station A. When the speed of the mobile stations is fast and the waiting time is long, the number of blocked zones on one side of the moving mobile station A may differ from the number of blocked zones on the other side of the mobile station A. This arrangement is effective in that the total number of blocked zones can be decreased. In order to attain this purpose, the mobile station 101 in FIG. 1 may be adapted to send out two kinds of supervisory signals which are different, from each other depending on the directions of forward movement so that either signal may be received by the receiver 113 in the control station 104 during the connection control and stored in the trunk 114 until connection is completed.

A restoring operation upon completion of the oral communication is effected under control of the control station 104. When the subscriber belonging to the mobile station 101 puts down the handset, the supervisory signal is sent out from the mobile station 101 to be received by the receiver 113 in the control station 104. The trunk 114 identifies the restoration of the mobile station 101 and indicates it on the switching apparatus 106 by way of the trunk line 107. When the operator of the switching apparatus 106 makes a forward-transfer operation as required, the trunk 114 identifies it and sends out a ringing signal to the mobile station 101 as in the case of the origination of a call. When the operator of the switching apparatus 106 makes a clear-forward operation irrespective of the restoration of the subscriber belonging to the mobile station 101, the trunk 114 identifies it and after sending out the clear-forward signal to the mobile station 101 for a fixed period of time, restores all the connections in the control station 104. The mobile station 101 is restored upon receiving the clear-forward signal.

The outline of the mobile communication system according to the present invention will be understood from the foregoing description given with reference to FIGS. 1 and 2. Practical circuits of the mobile station and the control station will be described more in detail with reference to FIGS. 3 to 11.

Figure 3:
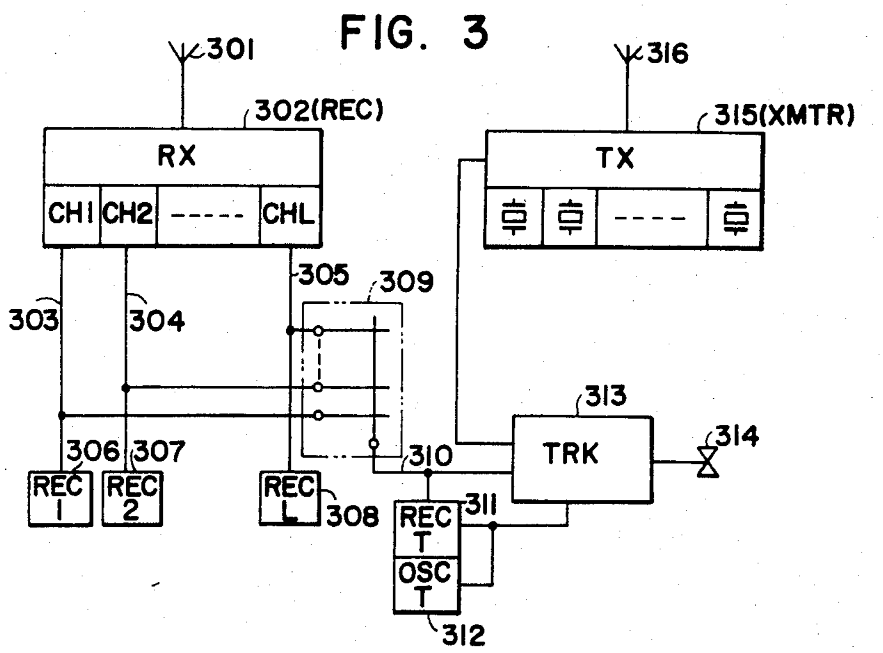
FIG. 3 is a block diagram of a mobile station.

FIG. 3 is a block diagram for illustrating the structure of the mobile station. The mobile station comprises a receiving antenna 301, a receiver 302, output leads 303, 304 and 305 extending from the receiver 302 corresponding to respective radio frequencies, receivers 306, 307 and 308 for idle-line signals and channel specifying signals corresponding to respective radio frequencies, cross points 309 for connection, an output lead 310 extending from the cross points 309, a receiver 311 for the address signal and ringing signal, an oscillator 312, a trunk 313, a handset 314, a transmitter 315 and a transmitting antenna 316.

The mobile station operates in a manner as described below when a call arrives thereat from the control station. An idle-line signal for an idle and available radio frequency is sent out from the control station and is received by the receivers 306, 307 and 308 in the mobile station. The idle-line signal ceases to be sent out when a call is originated in the control station. Upon identifying the cessation of the idle-line signal, a control circuit (not shown) in the mobile station identifies that the trunk 313 is idle and available and closes the cross point 309. The address signal sent out from the control station is received by the receiver 311 through a route including the receiving antenna 301 — receiver 302 — lead 303, 304 or 305 — cross point 309 — lead 310 — receiver 311, and arrival of a call is indicated on the trunk 313. The trunk 313 holds the cross point 309 and starts the transmitter 315. Then, the zone specifying signal and supervisory signal which are the output from the oscillator 312 are sent out to the control station through a route including the oscillator 312 — trunk 313 — transmitter 315 — transmitting antenna 316. Upon receiving the supervisory signal, the control station ceases to send out the address signal and now sends out the ringing signal. When the ringing signal is received by the receiver 311 in the mobile station, the trunk 313 identifies it and indicates arrival of the call. When the subscriber picks up the handset in response to arrival of the call, the trunk 313 ceases to send out the supervisory signal and the control station ceases to send out the ringing signal. Upon identifying the cessation of the ringing signal, the trunk 313 establishes a talking path among the handset 314, transmitter 315 and receiver 302 so that oral communication can be made through that path. When the call originated in the control station is directed to another mobile station, the address signal is not received by the receiver 311. Due to the fact that the address signal is not received within a fixed period of time, the trunk 313 locks out the terminating call and releases the cross point 309. Thus, the trunk 313 is now idle and available for another call. The locked-out radio frequency continues to be locked out until an idle-line signal is received again.

When the subscriber belonging to the mobile station raises the handset 314 for originating a call, the trunk 313 identifies it and starts the control circuit (not shown). The control circuit selects an idle and available radio frequency and closes the cross point 309. The trunk 313 starts the transmitter 315 so that the zone specifying signal and supervisory signal which are the output from the oscillator 312 are sent out to the control station through a route including the oscillator 312 — trunk 313 — transmitter 315 — transmitting antenna 316. Upon identifying that a call is originated in the mobile station, the control station ceases to send out the idle-line signal and now sends out the ringing signal. Upon identifying the reception of the ringing signal by the receiver 311, the trunk 313 ceases to send out the supervisory signal. A talking path is established when the control station identifies the cessation of the supervisory signal and ceases to send out the ringing signal.

The ratio frequency is altered to another radio frequency in a manner as described below when a mobile station during oral communication at a radio frequency approaches another mobile station which is also during oral communication at the same radio frequency. Suppose that $CH_1$ in FIG. 3 is the radio frequency being used, then the oral communication is being made through the following routes: receiving antenna 301 — receiver 302 — lead 303 — cross point 309 — lead 310 — trunk 313 — handset 314 for reception; and handset 314 — trunk 313 — transmitter 315 — transmitting antenna 316 for transmission.

When the control station identifies approach of the two mobile stations toward each other and intends to alter the radio frequency from $CH_1$ to $CH_2$ shown in FIG. 3, the channel specifying signal corresponding to the latter radio frequency is sent out to the mobile station and is received by the receiver 307. Upon arrival of this signal, the control circuit (not shown) identifies that the radio frequency must be altered from $CH_1$ and $CH_2$ and shifts the cross point 309 from the previous position corresponding to the lead 303 to a new position corresponding to the lead 304. At the same time, the radio frequency transmitted from the transmitter 315 is also altered and the zone specifying signal for the new radio frequency is sent out.

The clear-forward signal sent out from the control station at the completion of the oral communication is received by the receiver 311. The trunk 313 identifies it and ceases to start the transmitter 315. The cross point 309 is also released thereby. The radio frequency that has been used is locked out until an idle-line signal is received.

Figure 4:
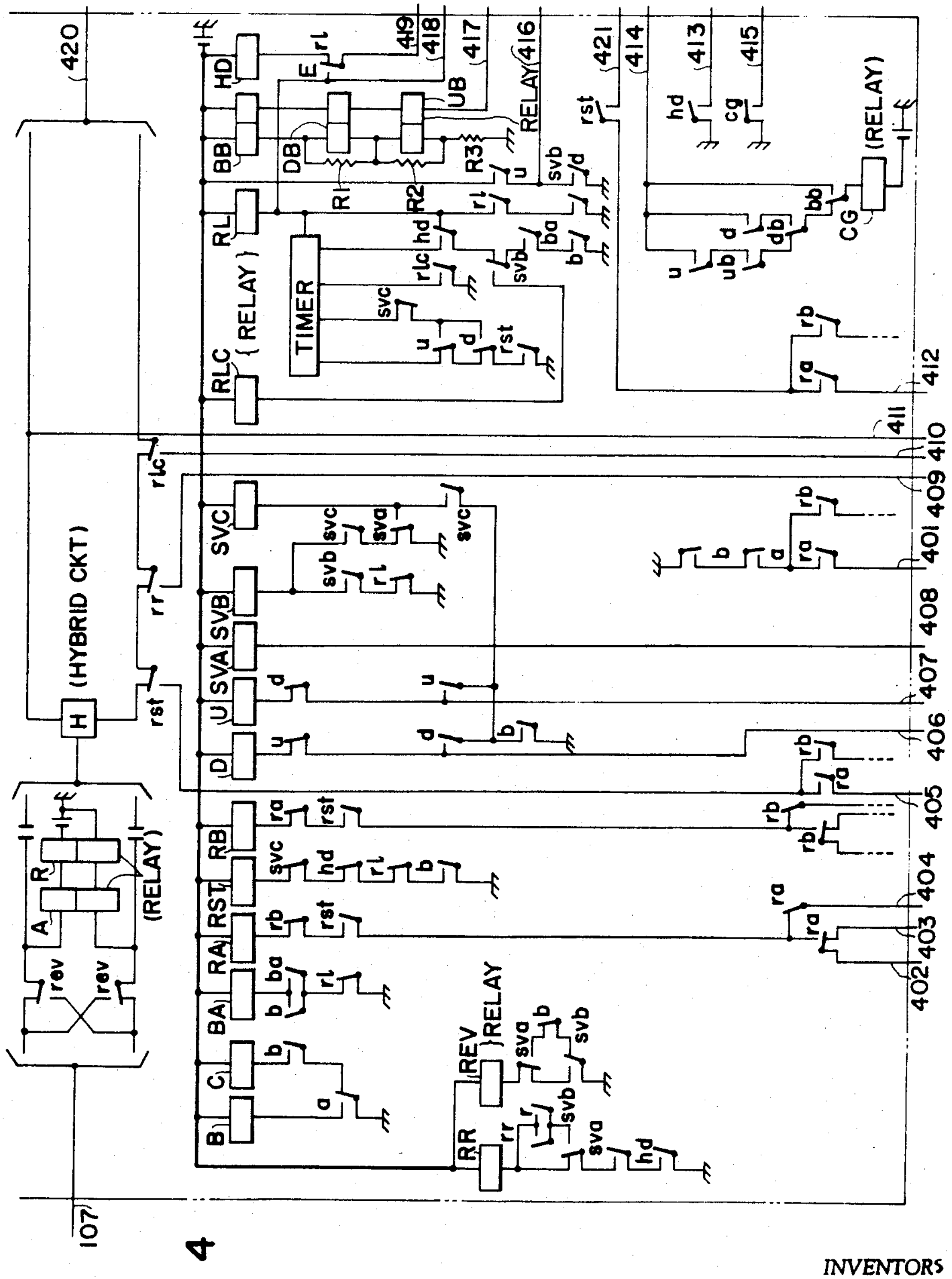
FIGS. 4 through 11 are circuit diagrams showing principal parts of a control station.

FIGS. 4 through 11 show especially important circuit portions of the control station in the embodiment of the present invention and many portions are omitted therein. More precisely, many units or many leads are represented by a single unit or single lead and only part of a certain unit is shown. Further, the drawing shows only those circuit portions which are required for the basic operation and does not include any means to deal with abnormal operation and means to improve the reliability. The present embodiment is constituted mainly of relays whose relay coils are represented by a rectangle affixed by capitals and whose contacts are represented by corresponding lower-case letters. Other parts and circuits have their name or abbreviation thereof entered within respective rectangles. Numbers are attached to leads connected with other circuits in these figures and the same number is attached to the corresponding leads shown in separate Figures. The number of trunks in the control station and the number of radio frequencies (channels) in each zone are N and L, respectively, and the trunk shown in FIG. 4 is designated as trunk No. 1.

The circuit operation will be described in sequence hereunder.

1. Origination of Call from Control Station

In the case of a call originated from the control station, the trunk shown in FIG. 4 is started by way of the trunk line 107. A relay A is first energized, and relays B and BA are subsequently energized through a route which is traced from ground — contact *a* — relay B to battery, and a route which is traced from ground — contact *rl* — contact *b* — relay BA to battery, respectively. A relay RST is energized through a route which is traced from ground — contact *b* — contact *rl* — contact *hd* — contact *svc* — relay RST to battery so as to select an idle and available register. There are two selectable register and one of them is selected depending on energization of a relay RA or RB. The relays RA and RB constitute a double lock-out circuit with relays of the same name are disposed in other tranks constituting the same group. Thus the relays RA and RB prevent simultaneous seizure of the same register by two trunks.

Figure 5:
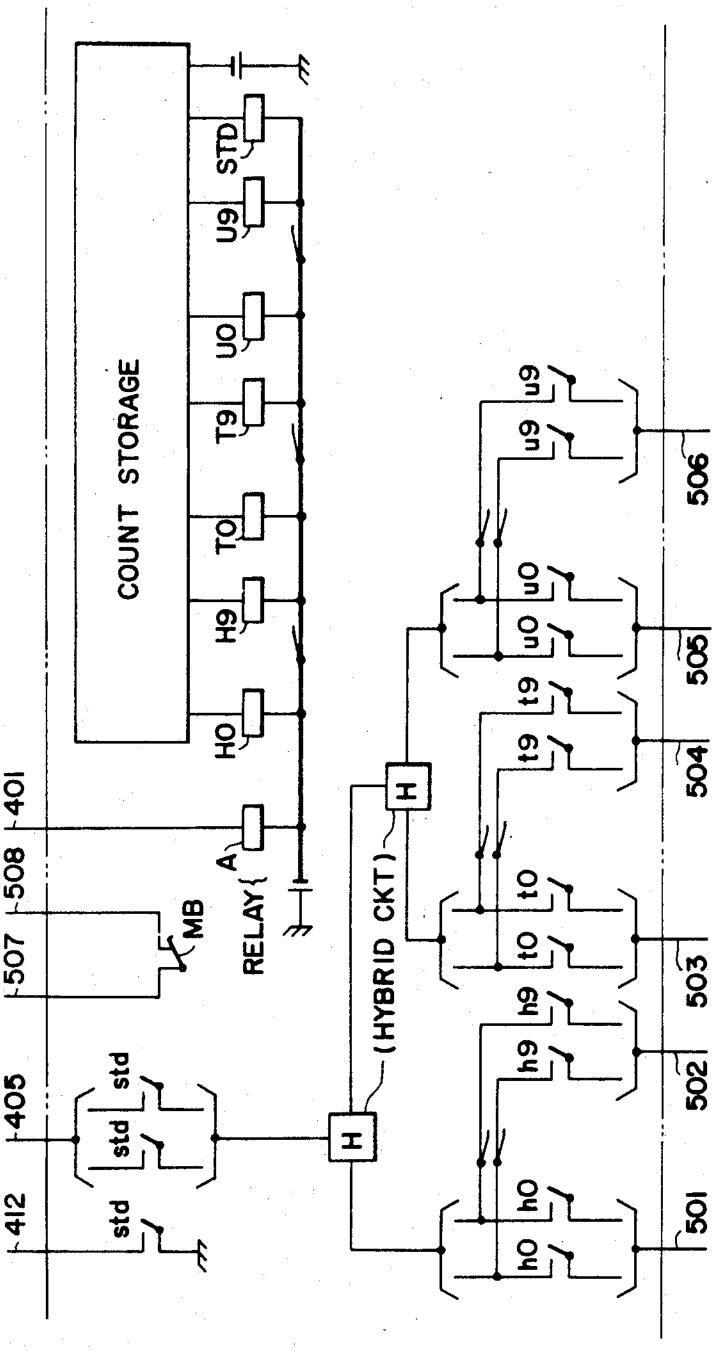

The dial impulse sent out from the switching apparatus is relayed by the relay A in the trunk and a relay A in the register shown in FIG. 5 is discontinuously operated in response to the dial pulses through a route which is traced from ground — contact *b* — contact *a* — contact *ra* or *rb* — lead 401 — relay A to battery.

The dial pulses are counted by and stored in a counter and storage shown in FIG. 5 whose detailed structure is not shown. The mobile station is not shown. The mobile station number consists of three figures (numerals). The numeral of the third order, the numeral of the second order and the numeral of the first or unit order are stored by the holding of relays HO, - - - H9, relays TO, - - - T9, and relays UO, - - - U9, respectively. After the three numerals are stored, a relay STD is energized. Since the relay STD is energized, the common control circuit is started by way of the trunk (trunk No. 1) shown in FIG. 4 and a relay $OP_1$ shown in FIG. 6 is energized through a route which is traced from ground — contact *std* (FIG. 5) — lead 412 — contact *ra* (FIG. 4) — contact *rst* (FIG. 4) — lead 421 — relay $OP_1$ (FIG. 6) — contact $op_1$ — contact $op_n$ - — - contact $op_1$ to battery.

Figure 6:
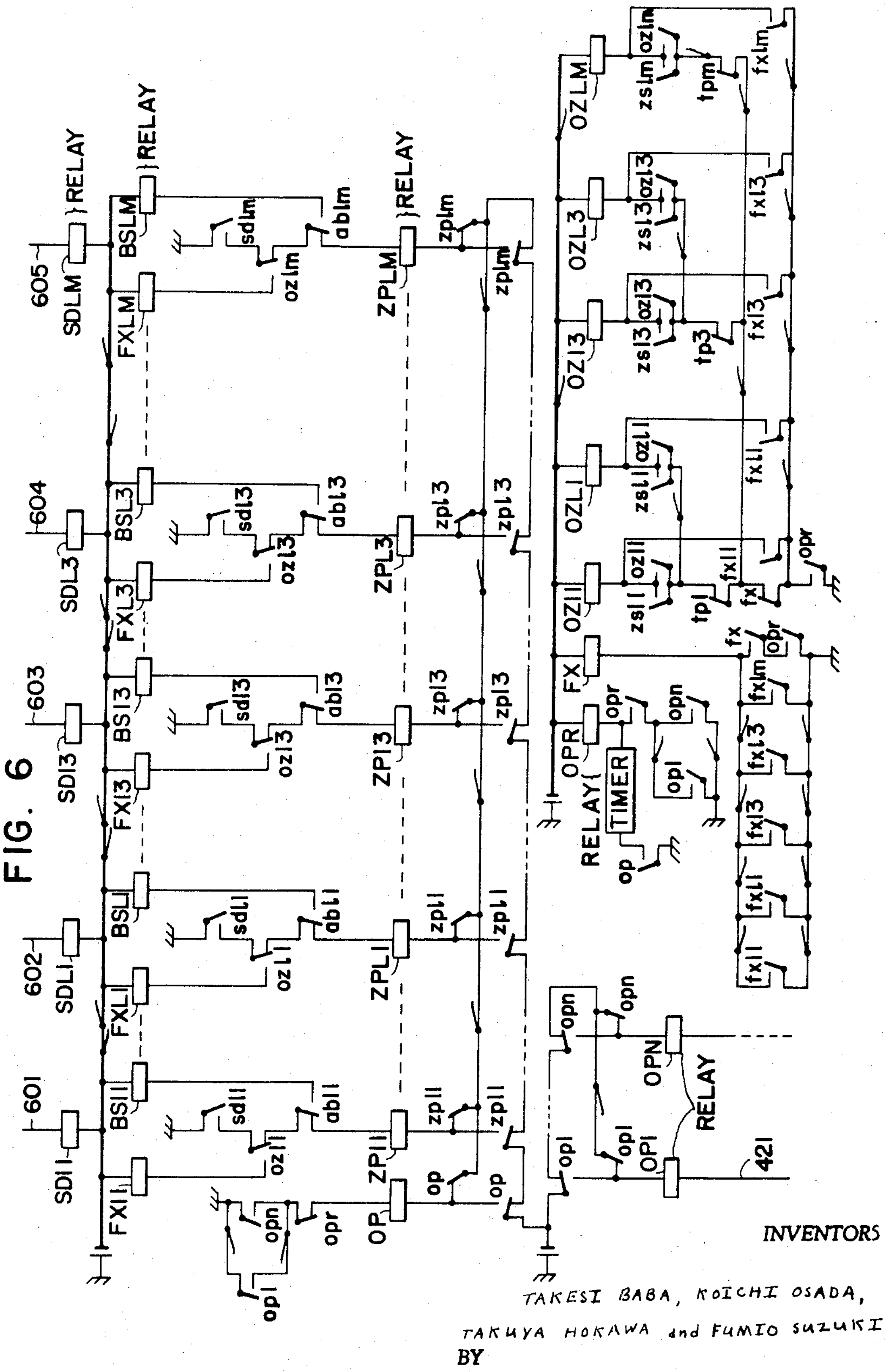
Figure 7:
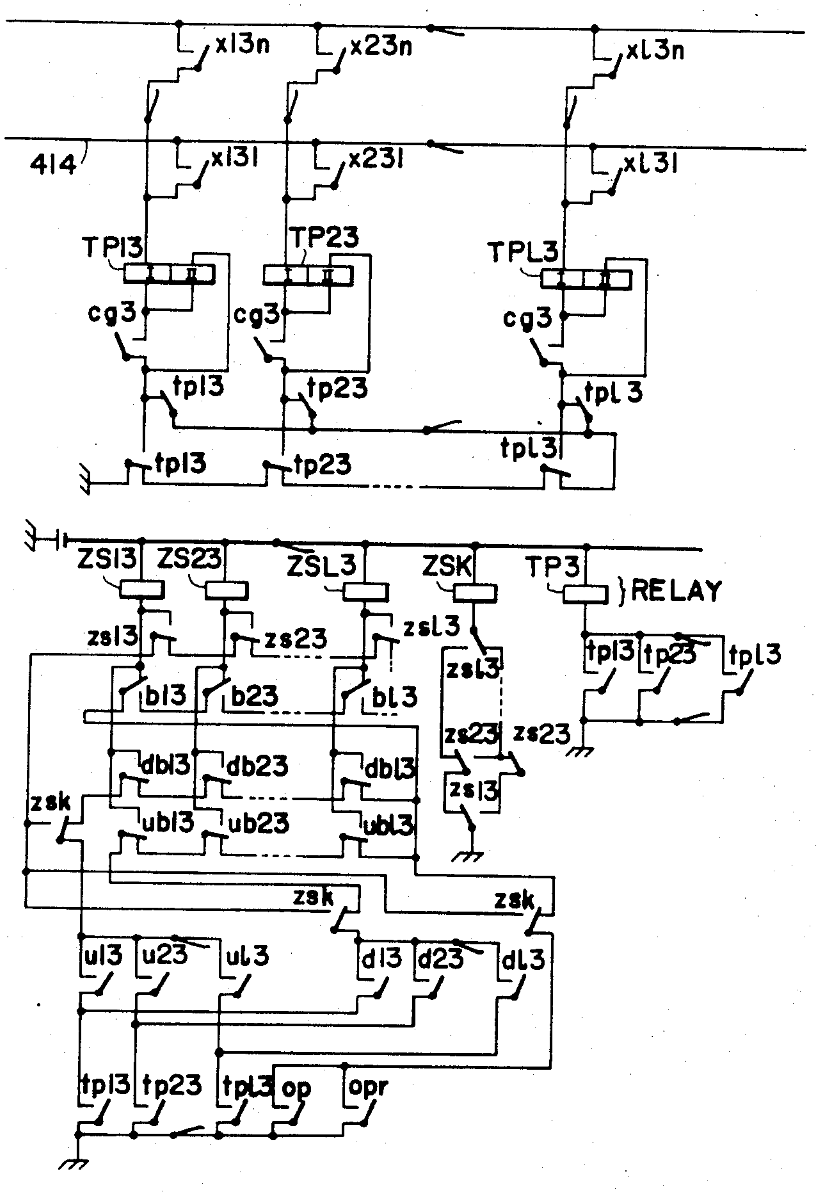
Figure 11:
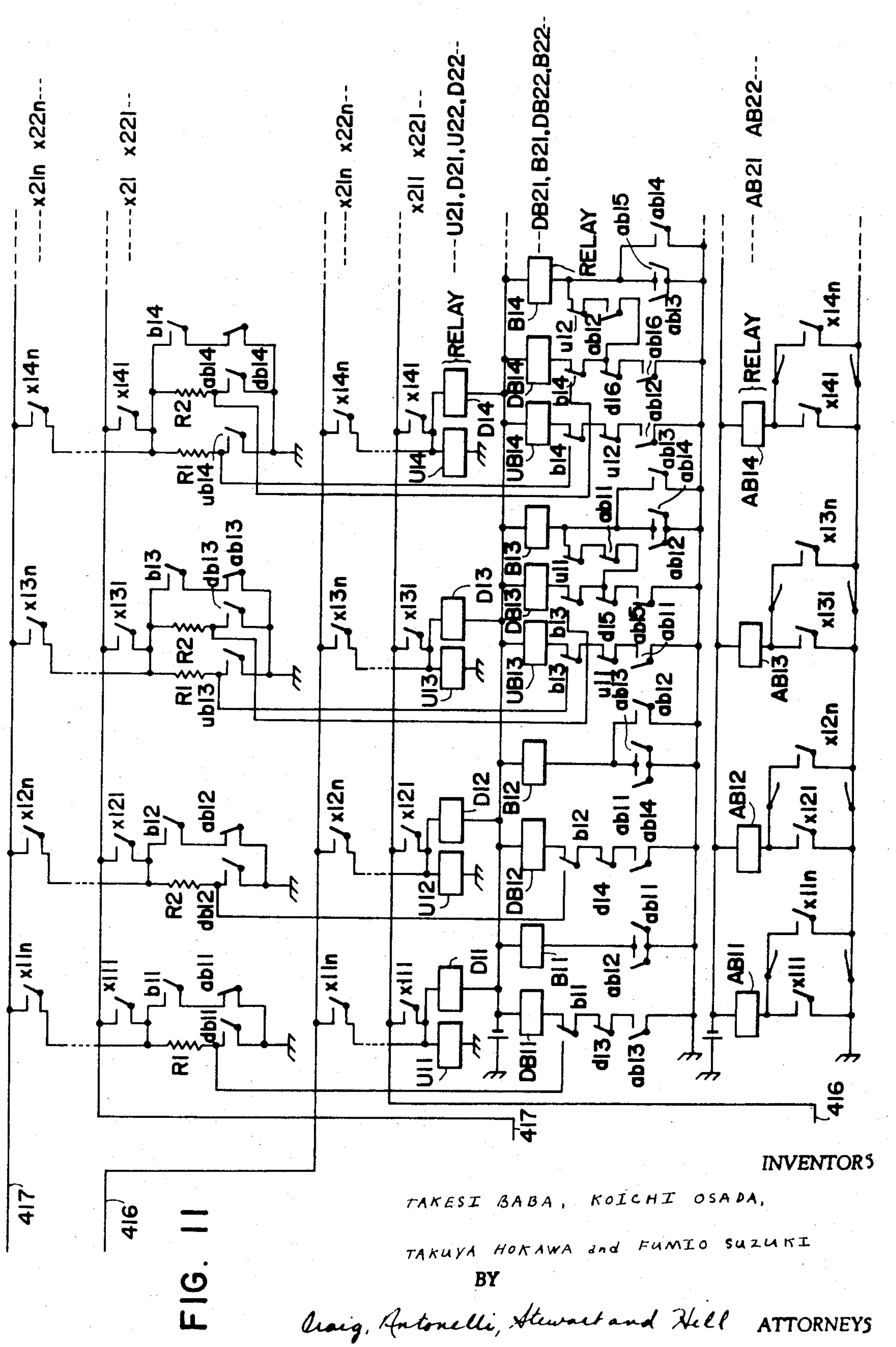

A relay OP shown in FIG. 6 is then energized through a route which is traced from ground — contact $op_1$ — contact *opr* — relay OP — contact *op* — contact *zp*1*m* - - - - - contact $zp1_3$ - - - - - contact $zp1_3$ - - - - - contact $zp1_1$ - - - - - contact *zp*11 — contact *op* to battery. When the relay OP is energized, an idle and available radio frequency selection circuit in FIG. 7 forming a part of the common control circuit selects an idle and available radio frequency. FIG. 7 shows only a circuit portion which corresponds to the third zone. When the L-th radio frequency is idle and available, a relay $ZSL_3$ is energized through a route which is traced from ground — contact *op* — contact *zsk* — contact *b*13 — contact *b*23 - - - - - contact *bl*3 - relay ZSL3 to battery. The contacts *b*13, *b*23 and *bl*3 are contacts of a relay for indicating the busy condition of the first radio frequency, second radio frequency and L-th radio frequency, respectively. This relay is shown in FIG. 11 and its operating conditions will be described later. Thus, one idle and available radio frequency is selected for each zone.

Figure 8:
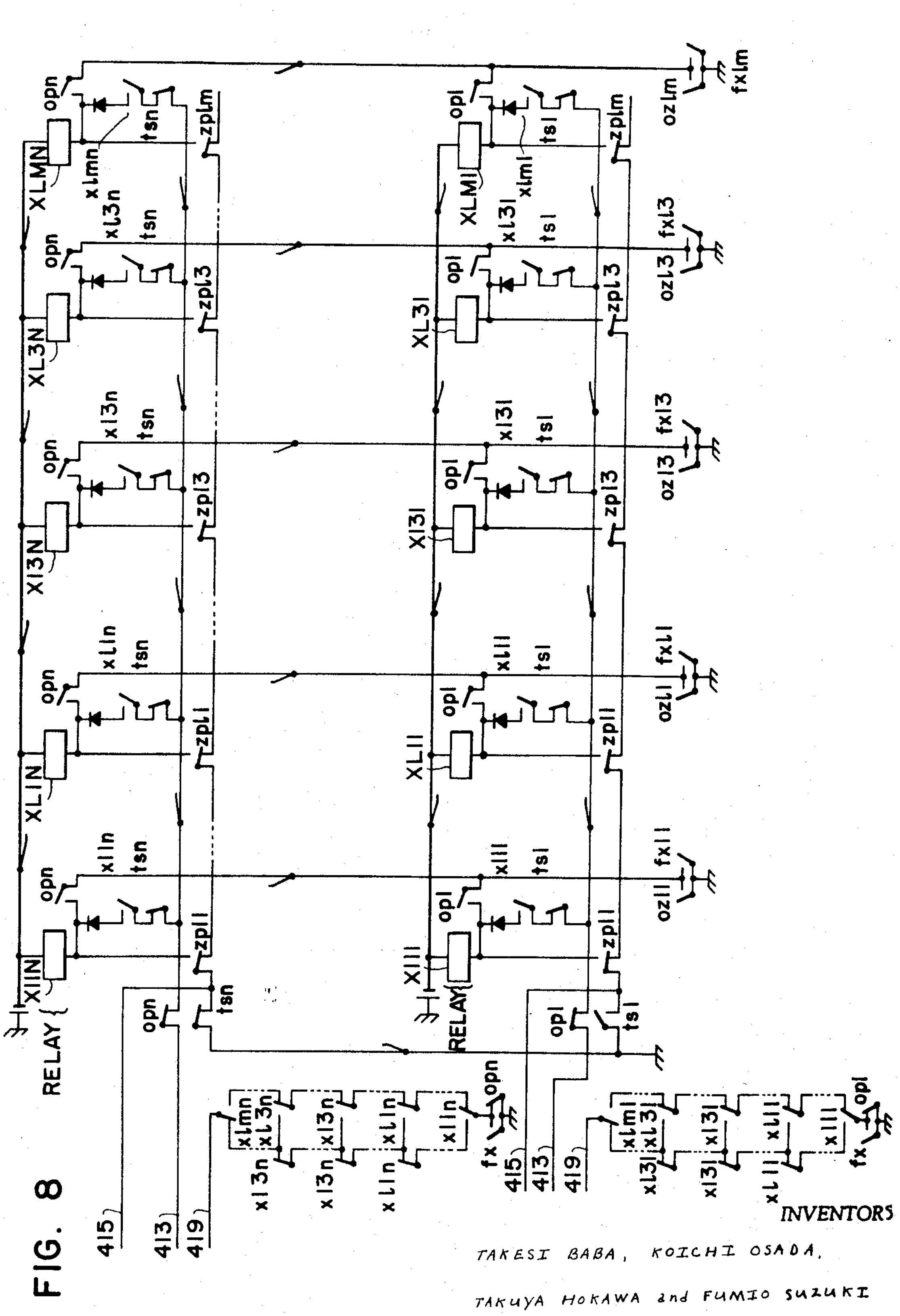

When the relay OP in FIG. 6 is energized, a timer is started and after a fixed short period of time, a relay OPR is energized through a route which is traced from ground — contact *op* — timer — relay OPR to battery. The relay OPR holds itself through the contact *opl* and disconnects the operating circuit of the relay OP to restore the latter. At the same time, the relay OPR energizes a relay OZL3 and relays OZ corresponding to other zones through a circuit which is traced from ground — contact *opr* — contact *fx* — contact *tp*3 — contact *zsl*3 — relay OZL3 to battery. When the relays OZ corresponding to the respective zones are energized, a cross point relay XL31 in FIG. 8 is energized through a route which is traced from ground — contact *ozl*3 — contact *opl* — relay XL31 to battery. Since cross point relays corresponding to the respective zones are thus energized, talking lines extending from the trunk are connected with the respective zones although not shown in the drawing.

Figure 9:
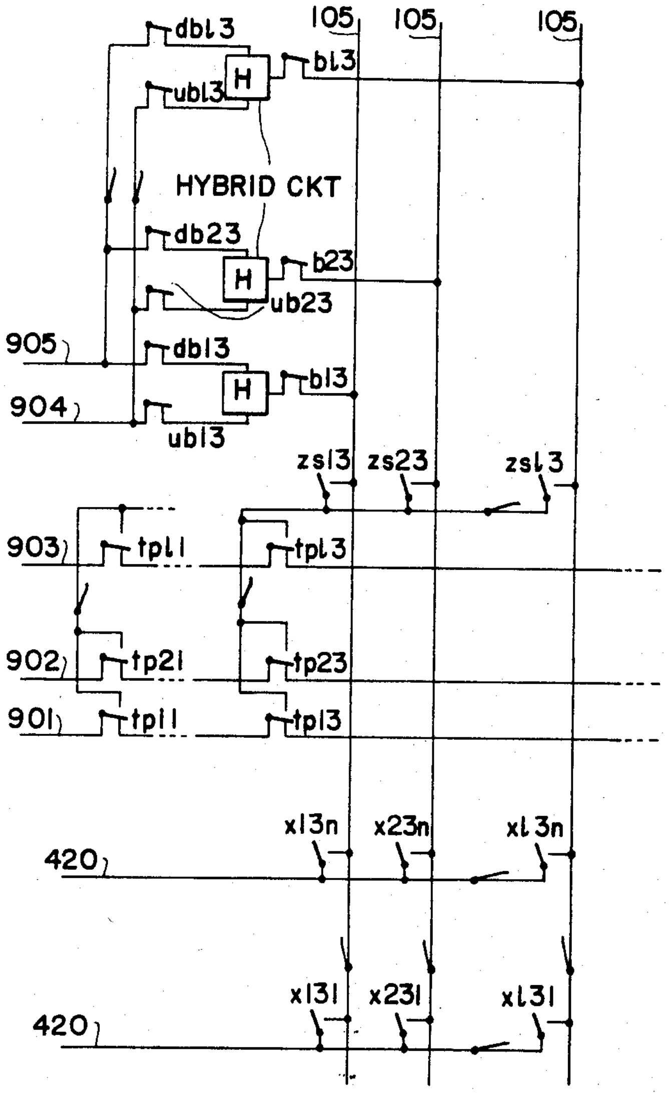

Subsequently, the address signal is sent out to the respective zones by way of a route including the oscillator (not shown) — contacts *h*0, - - - *h*9, *t*0, - - - *t*9 and *u*0, - - - *u*9 — hybrid circuits H — contact *std* (FIG. 5) - lead 405 — contact *ra* (FIG. 4) — contact *rst* — contact *rr* — contact *rlc* — lead 420 — cross point (not shown) - - - -. The address signal consists of three frequencies corresponding to the figures of the third order, second order and first order. That is to say, the output from the oscillator is supplied to leads 501, 502, 503, 504, 505 and 506 to be selected by the contacts *h*0, - - - *h*9, *t*0, - - - *t* 9 and *u*0, - - - *u*9 and the frequencies are mixed by the hybrid circuits. When the cross point relay XL31 shown in FIG. 8 is energized, a relay ABL3 is energized in the circuit shown in FIG. 11. The circuit shown in FIG. 11 corresponds to the first radio frequency. For example, when the first radio frequency is selected in the second zone, a cross point relay X121 is energized and a relay AB12 in FIG. 11 is energized through a circuit which is traced from ground — contact *x*121 — relay AB12 to battery. As a result of energization of the relay AB12, a relay B12 is energized through a circuit which is traced from ground — contact *ab*12 — relay B 12 to battery. When the relay B12 is energized, the corresponding radio frequency is blocked and can not be selected in the radio frequency selection circuit shown in FIG. 7. At the same time, a circuit not shown acts to cease the sending of the idle-line signal which has been sent out. The circuit for sending out the idle-line signal is shown in FIG. 9 and will be described later.

When the address signal is received by the desired mobile station, the latter sends out the zone specifying signal. When the zone specifying signal is received by the control station, a relay SD is energized in the circuit shown in FIG. 6. Suppose that the mobile station is located in the third zone, then the zone specifying signal is received at the L-th radio frequency at which the address signal is being sent out, and a relay SDL3 is energized by way of a lead 604. Subsequently, a relay FXL3 is energized through a circuit which is traced from ground — contact *sdl*3 — contact *ozl*3 — relay FXL3 to battery. Further, a relay FX is energized through a circuit which is traced from ground — contact *fxl*3 — relay FX to battery and identifies that the mobile station is seized.

The relays OZ which have been energized corresponding to the radio frequency selected for each zone have their operating circuit disconnected at the contacts *fx* and are restored. Subsequently, the cross point relays shown in FIG. 8 are restored as a result of the restoration of the relays OZ. However, the relays OZL3 and XL31 corresponding to the radio frequency of the seized mobile station continue to be energized through a circuit which is traced from ground — contact *opr* — contact *fxl*3 — relay OZL3 to battery and a circuit which is traced from ground — contact *fxl*3 — contact *opl* — relay XL31 to battery, respectively. In this manner, the relays corresponding to other zones except the required cross point relay XL31 are restored. Subsequently, a relay HD in the trunk shown in FIG. 4 is energized through a route which is traced from ground — contact *fx* — contact *x*111 - - - - - contact *xl*11 - - - - - contact *x*131 - - - - - contact *xl*31 - - - - - contact *lm*1 (FIG. 8) — lead 419 — contact *rl* (FIG. 4) — relay HD to battery. When the relay HD is energized in the trunk shown in FIG. 4, the relay RST has its operating circuit disconnected and is restored. As a result, the register is released and the relay OP1 in the common control circuit shown in FIG. 6 is also restored. In the meantime, the cross point relay XL31 continues to be energized through a circuit which is traced from ground — contact *hd* (FIG. 4) — lead 413 — contact *opl* (FIG. 8) — contact *tsl* — contact *xl*31 — diode — relay XL31 to battery. When the relay OP1 in FIG. 6 is restored, the relays OPR, OZL3 and FXL3 are restored in that order, and a relay BSL3 continues to be energized through a circuit which is traced from ground — contact *sdl*3 — contact *ozl*3 — contact *abl*3 — relay BSL3 to battery.

The mobile station is sending out the supervisory signal together with the zone specifying signal, and the superivisory signal is received by a receiver not shown. This signal has different frequencies depending on whether the mobile station is up-bound or down-bound and the receiver discriminates the frequencies. When the mobile station is up-bound, ground potential is supplied to leads 407 and 408 in FIG. 4 for energizing relays U and SVA, respectively. A relay SVC is energized through a circuit which is traced from ground — contact *sva* — relay SVC to battery and continues to be energized until connection is completed. A relay RR is energized through a circuit which is traced from ground — contact *hd* — contact *sva* — contact *svb* — relay RR to battery. The ringing signal is sent out to the mobile station through a route including the oscillator (not shown) — lead 409 — contact *rr* — contact *rlc* — lead 420.

When the ringing signal is received by the mobile station, arrival of a call is indicated by the ringing of the ball. The supervisory signal is ceased to be sent out when the subscriber belonging to the mobile station picks up the handset and answers the call. Upon cessation of sending out of the supervisory signal, the relay SVA in FIG. 4 is restored and a relay SVB is energized through a circuit which is traced from ground — contact *sva* — contact *svc* — relay SVB to battery. Restoration of the relay SVA is followed by restoration of the relay RR thereby to cease sending out of the ringing signal, and an oral communication path is established by a route including the lead 107 — contact *rev* — capacitor — hybrid coil H — contact *rst* — contact *rr* — contact *rlc* — lead 420. When the relay SVB is energized, a relay REV in FIG. 4 is energized through a route which is traced from ground — contact *svb* — contact *sva* — relay REV to battery, and the polarity with respect to the trunk line 107 is inverted to indicate the answer to the call. When the relay U is energized, power is supplied from the battery to a lead 416 in FIG. 4 to effect zone blocking in a manner as will be described in detail later.

2. Arrival of Call at Control Station

When an up-bound mobile station traveling through the first zone originates a call by selecting the first radio frequency, the zone specifying signal is received by the control station and a relay SD11 in FIG. 6 is energized. Then, a relay ZP11 is energized through a route which is traced from ground — contact *sd*11 — contact *oz*11 — contact *ab*11 — relay ZP11 — contact *zp*11 — contact *zplm* - - - - - contact *zpl*3 - - - - - contact *zp*13 - - - - - contact *zpl*1 - - - - - contact *zp*11 - contact *op* to battery. When the relay ZP11 is energized, an idle and available trunk is selected in FIG. 10. The presence of idle and available trunks is indicated by the released state of contacts *tb*1, - - - *tbn*. Suppose that the trunk No. N only is idle and available, a relay TSN is energized through a route which is traced from ground — contact *zp*11 — contact *zs*11 — contact *ts*1 — contact *ts*2 - - - - - contact *tsn* — contact *zp*11 — contact *bs*11 — contact *zp*12 — contact *bs*12 — contact *zp*11 — contact *x*121 — contact *x*122 - - - - - contact *x*12*n* — contact *bs*13 — contact *zp*12 — contact *zp*14 - - - - contact *bs*1*m* — contact *zp*1*m*–1 — contact *tb*1 — contact *tb*2 - - - - - contact *tbn* — relay TSN to battery. A cross point relay X11N in FIG. 8 is energized through a route which is traced from ground — contact *tsn* — contact *zp*11 — relay X11N to battery. In FIG. 11, relays AB11, B11, B12 and UB13 are energized through a route which is traced from ground — contact *x*11*n* — relay AB11 to battery, a route which is traced from ground — contact *ab*11 — relay B11 to battery, a route which is traced from ground — contact *ab*11 — relay B12 to battery, and a route which is traced from ground — contact *ab*11 — contact *u*11 — contact *b*13 — relay UB13 to battery, respectively. In FIG. 4, the relay HD is energized through a route which is traced from ground (FIG. 8) — contact *opn* — contact *x*11*n* - - - - - contact *xl*1*n* - - - - - contact *x*13*n* - - - - - contact *x*13*n* - - - - - contact *xlmm* (FIG. 8) — lead 419 — contact *rl* (FIG. 4) — relay HD to battery.

As a result of energization of the relay AB11, the operating circuit of the relay ZP11 in FIG. 6 is disconnected and a relay BS11 is energized through a route which is traced from ground — contact *sd*11 — contact *oz*11 — contact *ab*11 — relay BS11 to battery. As a result of restoration of the relay ZP11, the relay TSN has its operating circuit disconnected and is restored. Although the operating circuit of the cross point relay X11N is also disconnected, the relay X11N continues to be energized through a circuit which is traced from ground (FIG. 4) — contact *hd* (FIG. 4) — lead 413 — contact *opn* (FIG. 8) — contact *tsn* — contact *x*11*n* — diode — relay X11N to battery. The supervisory signal sent out together with the zone specifying signal from the mobile station is received by the receiver. Since the mobile station under consideration is upward-bound, the relays U and SVA in FIG. 4 are energized by way of leads 407 and 408, respectively. The relays SVC and RR are energized as in the case of the origination of a call from the control station and the ringing signal is sent out to the mobile station. As a result of energization of the relay U, a relay U11 in FIG. 11 is energized through a route which is traced from battery (FIG. 4) - contact *u* (FIG. 4) — lead 416 — contact *x*11*n* (FIG. 11) — relay U11 to ground. As a result of energization of the relay U11, the relay UB13 has its operating circuit disconnected and is restored.

Now, a method of blocking the mobile station against other mobile stations will be described. Energization of the relay UB13 described above means that the up-bound mobile station traveling through the third zone is blocked with respect to the first radio frequency. Further, energization of a relay DB13 means that a down-bound mobile station is blocked, while energization of a relay B13 means that both an up-bound mobile station and a down-bound mobile station are blocked. Therefore, when the first radio frequency is in use in the first zone, both the up-bound and down-bound mobile stations traveling through the first and second zones are blocked. In the case of the third zone, the up-bound mobile station is blocked only when the mobile station during oral communication in the first zone is down-bound.

The mobile station ceases to send out the supervisory signal when it receives the ringing signal. Therefore, the relay SVB is energized as in the case of the origination of a call from the control station. The relay REV is then energized and the polarity of the trunk line 107 is inverted to indicate arrival of a call. When the operator of the attendant board answers the call, the relay A is energized as in the case of origination of a call from the control station and then the relays B and BA are energized sequentially. When the mobile station ceases to send out the supervisory signal, the ringing signal is ceased to be sent out and a talking path is established as in the case of the origination of a call from the control station.

3. Zone Switch-over

Figure 10:
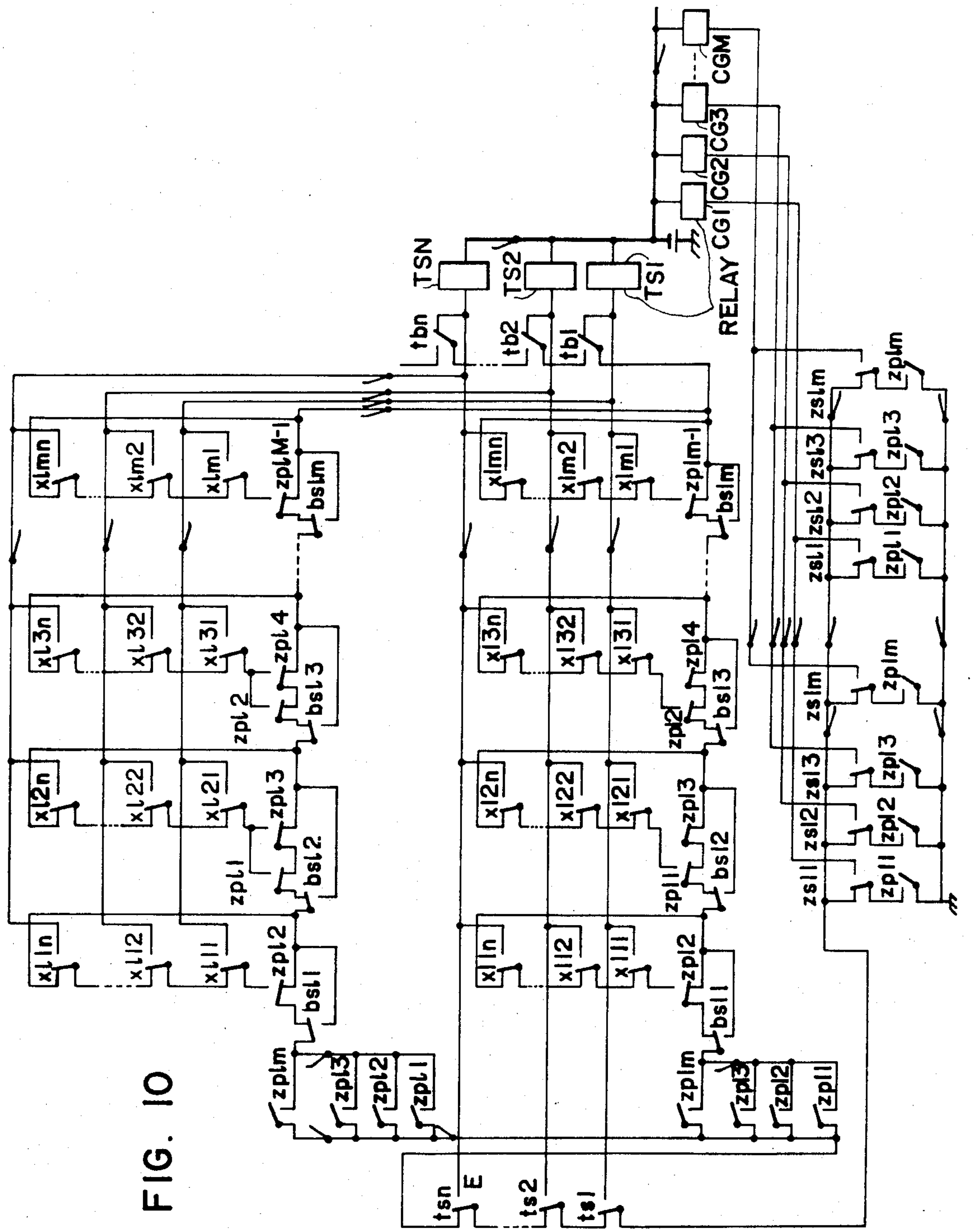

Suppose that a mobile station is during oral communication with the first radio frequency in the second zone. In such a case, relays SD12 and BS12 are in their energized state although they are not shown in the drawing. Relays AB12, B11, B12, B13, UB14 and D12 are also in operation. Suppose further that the trunk No. 1 is in use, then the cross point relay X121 is in operation and various other relays in the trunk are also in operation as described previously. When this mobile station moves into the third zone from the second zone, the zone specifying signal sent out from the mobile station ceases in the second zone and is received in the third zone. Therefore, the relays SD12 and BS12 are restored and a relay SD13 is energized. As a result of energization of the relay SD13, a relay ZP13 in FIG. 6 is energized through a route which is traced from ground — contact *sd*13 — contact *cz*13 — contact *ab*13 — relay ZP13 — contact *zp*13 — contact *zplm* - - - - - contact *zpl*3 - - - - - contact *zp*13 - - - - - contact *zpl*1 - - - - - contact *zp*11 - contact *op* to battery. A relay TS1 in FIG. 10 is energized through a route which is traced from ground — contact *zp*13 — contact *zs*13 — contact *ts*1 — contact *ts*2 - - - - - contact *tsn* — contact *zp*13 — contact *bs*11 — contact *zp*12 — contact *bs*12 — contact *zp*11 — contact *zp*13 — contact *x*121 — relay TS1 to battery. As a result of energization of the relay TS1, the relay X121 has its operating circuit disconnected and is restored. A relay X131 in FIG. 8 is in turn energized through a route which is traced from ground — contact *ts*1 — contact *zp*11 - - - - - contact *zpl*1 - - - - - contact *zp*13 — relay X131 to battery. As a result of energization of the relay X131, relays AB13, B12, B13, B14, UB15 (not shown) and D13 in FIG. 11 are energized, but any detailed description will not be given herein.

When the relay AB13 is energized, the relay ZP13 in FIG. 6 is restored and the relay BS13 in FIG. 6 is energized. The relay TS1 in FIG. 10 is restored. The cross point relay X131 continues to be energized by the ground potential supplied from the trunk as described previously. Due to the switch-over of the previous cross point to the new cross point in this manner, oral communication can continuously be made in the new zone.

4. Alteration of Radio Frequency

Suppose that an up-bound mobile station in the fifth zone is during oral communication at the first radio frequency when the mobile station described previously which is during oral communication at the first radio frequency moves into the third zone. In such a case, the trunk No. 1 through which the oral communication is being made in the third zone at the first radio frequency identifies that the down-bound mobile station must be blocked. Relays DB and UB in FIG. 4 are energized through a route which is traced from ground (FIG. 11) — contact *ab*15 — contact *d*15 — contact *b*13 — resistor R2 — contact *x*131 (FIG. 11) — lead 417 — relay UB (FIG. 4) — relay DB — relay BB to battery. Then, a relay TP13 in FIG. 7 is energized through a route which is traced from battery (FIG. 4) - relay CG — contact *bb* — contact *db* — contact *d* (FIG. 4) — lead 414 — contact *x*131 (FIG. 7) — relay TP13 (I - II) — contact *tp*13 — contact *tpl*3 - - - - - contact *tp*23 — contact *tp*13 to ground (FIG. 7). In this circuit, the relay CG in FIG. 4 does not operate because the relay TP13 in FIG. 7 has a high resistance. As a result of energization of the relay TP13, an idle and available radio frequency is selected in FIG. 7. When the L-th radio frequency is solely idle and available for the down-bound mobile station, a relay ZSL3 is energized through a route which is traced from ground — contact *tp*13 — contact *d*13 — contact *zsk* — contact *ub*13 — contact *ub*23 - - - - - contact *ubl*3 — relay ZSL3 to battery. In the circuit shown in FIG. 9, the channel specifying signal which is the output from the oscillator not shown is sent out for the L-th radio frequency through a route including a lead 901 — contact *tp*11 - - - - - contact *tp*13 — contact *zsl*3 — lead 105.

Upon receiving the channel specifying signal, the mobile station sends out the zone specifying signal for the L-th radio frequency and a relay SDL3 in FIG. 6 is energized. Subsequently, the relay ZPL3 is energized as in the case of the arrival of a call or zone switch-over. A relay CG3 in FIG. 10 is energized through a route which is traced from ground — contact *zpl*3 — contact *zsl*3 — relay CG3 to battery and alteration of the radio frequency is thereby detected. As a result of energization of the relay CG3, one winding of the coil of the relay TP13 in FIG. 7 is shorted to provide a low resistance and the relay CG in FIG. 4 is energized. When the relay CG is energized, the relay XL31 in FIG. 8 is energized through a route which is traced from ground (FIG. 4) — contact *cg* (FIG. 4) — lead 415 — contact *zp*11 (FIG. 8) - - - - - contact *zpl* 1 - - - - - contact *zp*13 - - - - - contact *zpl*3 - relay XL31 to battery. Since the relay X131 is kept in its energized state and the relay XL31 is now energized, the relay HD described previously has its operating circuit disconnected and is restored. As a result, the relay X131 has its operating circuit disconnected and is restored. Restoration of the relay X131 is followed by restoration of the relays TP13, ZS13, CG3 and CG. Energization of the relay XL31 is followed by energization of relays ABL3, BL2, BL3, BL4, UBL5 and D13 not shown in FIG. 11. Energization of the relay ABL3 results in restoration of the relay ZPL3 and energization of the relay BSL3 in FIG. 6.

The alteration of the radio frequency is tried in the two mobile stations which are approaching each other. This is because an idle and available radio frequency may possibly exist in one of the mobile stations even if such an idle and available radio frequency does not exist in the other mobile station. When both mobile stations are found to have an idle and available radio frequency, the radio frequency is altered only in one of the two mobile stations since the contacts *tp*11, - - - *tp*13 constitute a chain circuit as seen in FIG. 9 and the channel specifying signal is only sent out from one of the base stations as far as the same radio frequency is concerned.

The idle-line signal sending circuit is shown in FIG. 9. Suppose that the first radio frequency is idle and available in the third zone, then the idle-line signal for the up-bound mobile station and the idle-line signal for the down-bound mobile station are sent out through respective routes including the oscillator (not shown) - lead 904 — the oscillator (not shown) — lead 905 — contact ub13 \
contact db13 / hybrid circuit H — contact b13 — lead 105. When the up-bound mobile station or the down-bound mobile station is to be blocked, the contact *ub*13 or the contact *db*13 is operated to stop sending either signal.

The signal system for the alteration of the radio frequency in the embodiment of the present invention is most suitable for application to a mobile station which is adapted to simultaneously receive all the radio frequencies. That is, the channel specifying signal sent out from the control station to the mobile station is directed to the radio frequency used before the alteration and thus oral communication is in no way interfered. In a system in which the mobile station is equipped with only one set of receiver so that a plurality of radio frequencies are switched over in an automatically circulated fashion, a signal specifying the radio frequency to be used after alteration from the previous radio frequency used for the oral communication may be sent out. This manner of operation can easily be realized by a partial modification of the embodiment described above. In this case, the signal has preferably a frequency which lies outside of the oral communication frequency band since oral communication is interfered if it is selected to lie within the voice frequency band.

The above embodiment is so designed that the advancing direction of a mobile station is identified by the control station and the number of blocked zones is varied accordingly. However, the system may have solely the function of altering the radio frequency and may not have the function of identifying the advancing direction of the mobile station. In this case, the number of blocked zones on one side of the mobile station is equal to the number of blocked zones on the other side of the mobile station. Further, the system may not have the function of altering the radio frequency and may be such that it has the function of identifying the advancing direction of the mobile station and idle-line signals are provided for opposite advancing directions. This arrangement is naturally advantageous in respect of traffic over the prior arrangement in which a single kind of idle-line signal is solely provided. In such a case, the number of blocked zones is determined on the basis of the distance $l_1$ in FIG. 2 which distance is determined depending on the guaranteed period of time for oral communication.

It will be appreciated that the mobile communication system according to the present invention between a body moving at high speed and a fixed communication network increases the capacity of communication and improves the quality of service compared with prior art systems of this kind.

We claim:

1. A mobile communication system including a fixed station, a multiplicity of fixed radio stations belonging to said fixed station and having a transmitter and a receiver for a plurality of radio frequencies, a multiplicity of mobile stations having a transmitter and a receiver for a plurality of radio frequencies, and means for switching over one of said fixed radio stations to another under control of said fixed station when a mobile station during oral communication moves into one zone from another, characterized in that, when two mobile stations under oral communication at the same radio frequency approach each other, said fixed station issues an instruction to one of the two mobile stations to alter the radio frequency employed by said mobile station and to alter also the radio frequency employed by the corresponding fixed radio station.

2. A mobile communication system including a fixed station, a multiplicity of fixed radio stations belonging to said fixed station and having a transmitter and a receiver for a plurality of radio frequencies, a multiplicity of mobile stations having a transmitter and a receiver for a plurality of radio frequencies, and means for switching over one of said fixed radio stations to another under control of said fixed station when a mobile station under oral communication moves into one zone from another, characterized in that, when two mobile stations during oral communication at the same radio frequency approach each other, said fixed station checks for the presence of an alterable idle and available radio frequency in the zones of both the fixed radio stations through which the mobile stations are passing, and issues an instruction to the mobile station passing through the zone of either fixed radio station in which there is an idle and available radio frequency and to alter also the radio frequency employed by the said fixed radio station.

3. A mobile communication system including a fixed station, a multiplicity of fixed radio stations belonging to said fixed station and having a transmitter and a receiver for a plurality of radio frequencies, a multiplicity of mobile stations having a transmitter and a receiver for a plurality of radio frequencies, and means for switching over one of said fixed radio stations to another under control of said fixed station when a mobile station during oral communication moves into one zone from another, characterized in that, when two mobile stations under oral communication at the same radio frequency approach each other, said fixed station selects a radio frequency and sends out a signal indicating the radio frequency number under oral communication relative to the selected radio frequency thereby to instruct one of the mobile stations to alter the radio frequency employed by said mobile station.

4. A mobile communication system including a fixed station, a multiplicity of fixed radio stations belonging to said fixed station and having a transmitter and a receiver for a plurality of radio frequencies, a multiplicity of mobile stations having a transmitter and a receiver for a plurality of radio frequencies, and means for switching over one of said fixed radio stations to another under control of said fixed station when a mobile station during oral communication moves into one zone from another, characterized in that, when two mobile stations during oral communication at the same radio frequency approach each other, said fixed station selects a radio frequency and sends out a signal indicating the selected radio frequency number relative to the radio frequency employed for oral communication thereby to instruct one of the mobile stations to alter the radio frequency employed by said mobile station.

5. A mobile communication system including a fixed station, a multiplicity of fixed radio stations belonging to said fixed station and having a transmitter and a receiver for a plurality of radio frequencies, a multiplicity of mobile stations having a transmitter and a receiver for a plurality of radio frequencies, means for blocking one or more zones on each side of the zone of a fixed radio station through which zone a mobile station is moving during oral communication, and means for switching over said fixed radio station to another under control of said fixed station when said mobile station during oral communication moves from said zone into another, wherein when two mobile stations during oral communication at the same radio frequency approach each other, said fixed station issues an instruction to one of the two mobile stations to alter the radio frequency employed by said mobile station and to alter also the radio frequency employed by the corresponding fixed radio station, characterized in that said mobile station waits until there appears an idle and available radio frequency when such idle and available radio frequency does not exist in any one of the zones of the fixed radio stations through which zones the mobile stations are approaching each other, and the distance through which said mobile station moves during a maximum allowable waiting time is taken into account in blocking the zones.

6. A mobile communication system including a fixed station, a multiplicity of fixed radio stations belonging to said fixed station and having a transmitter and a receiver for a plurality of radio frequencies, a multiplicity of mobile stations having a transmitter and a receiver for a plurality of radio frequencies, means for blocking one or more zones on each side of the zone of a fixed radio station through which a mobile station is moving during oral communication, and means for switching over said fixed radio station to another under control of said fixed station when said mobile station during oral communication moves from said zone into another, wherein when two mobile stations during oral communication at the same radio frequency approach each other, said fixed station issues an instruction to one of the two mobile stations to alter the radio frequency employed by said mobile station and to alter also the radio frequency employed by the corresponding fixed radio station, characterized in that the number of blocked zones is varied depending on the direction of movement of said mobile station in blocking the zones.

7. A mobile communication system comprising a fixed station, a multiplicity of fixed radio stations associated with said fixed station, each of said fixed radio stations defining a communication zone and having a transmitter and a receiver for the same plural radio frequencies such that each communication zone utilizes the same plural radio frequencies, a multiplicity of mobile stations having a transmitter and a receiver for said plural radio frequencies, means for switching over one of said fixed radio stations to another under control of said fixed station when a mobile station during oral communication moves into one zone from another, said fixed station including means responsive to two mobile stations under oral communication at the same one of said plural radio frequencies while approaching each other for preventing communication interference between the two mobile stations, said interference preventing means including means for instructing one of the mobile stations to alter the radio frequency employed thereby to a different one of said plural radio frequencies and for altering the radio frequency employed by the fixed radio station for the one mobile station to the same different radio frequency, whereby the other mobile station continues to employ said same one radio frequency.

8. A mobile communication system as defined in claim 7, wherein said fixed station includes means for determining the presence of an alterable idle and available radio frequency in the zones of both the fixed radio stations through which the mobile stations are passing and for instructing one of the mobile stations to alter the radio frequency employed thereby in accordance with the available and idle radio frequency.

9. A mobile communication system as defined in claim 8, wherein said fixed station includes means for blocking one or more zones on each side of the zone of a fixed radio station through which a mobile station is passing during oral communication at one of said plural radio frequencies for preventing the other of said mobile stations to employ said one frequency in said blocked zones.

10. A mobile communication system as defined in claim 9, wherein the blocked zones are varied in dependence on the direction of movement of said mobile station.

* * * * *